United States Patent Office.

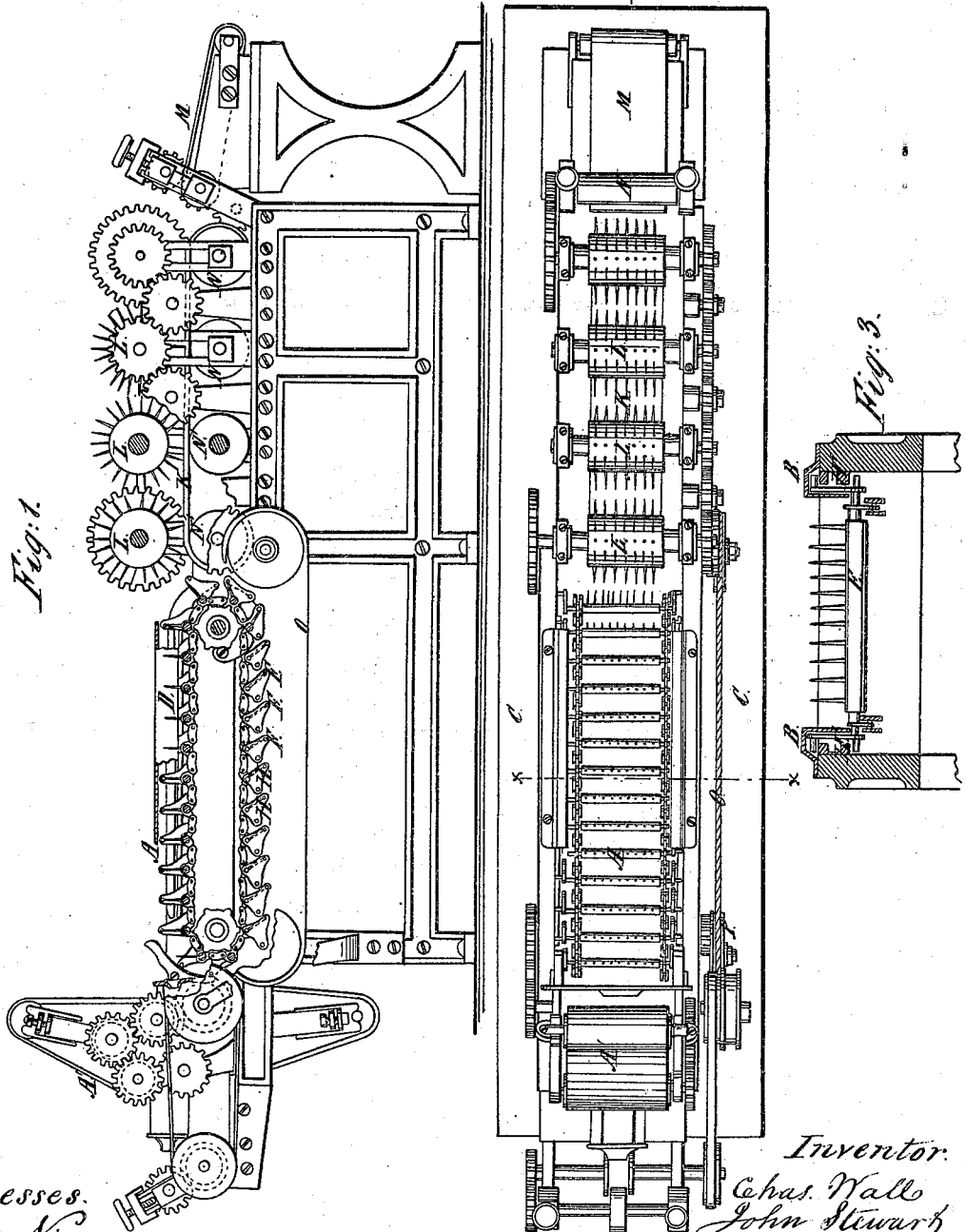

CHARLES WALL, OF NEW YORK, AND JOHN STEWART, OF BROOKLYN, NEW YORK.

Letters Patent No. 99,503, dated February 1, 1870.

IMPROVEMENT IN DRAWING-FRAMES FOR FLAX, HEMP, &c.

The Schedule referred to in these Letters Patent and making part of the same

*To all whom it may concern:*

Be it known that we, CHARLES WALL, of the city, county, and State of New York, and JOHN STEWART, of Brooklyn, in the county of Kings, and State of New York, have invented a new and improved Drawing-Frame; and we do hereby declare that the following is a full, clear, and exact description thereof, which will enable others skilled in the art to make and use the same, reference being had to the accompanying drawings, forming part of this specification.

This invention relates to improvements in drawing-frames for dressing manilla and all other hemp, and consists in the combination, with the endless chain and condensing-apparatus, such as commonly used for dressing the laps, and reducing them to slivers, of a series of revolving combs, working over an endless carrying-apron, and dressing the hemp, and delivering it in laps or bats to the said endless chain, in a way to serve as a substitute for the lap-machines now used for dressing the hemp, previous to being fed to the said endless chain. The said chain being arranged to move at a greater surface-speed than the revolving combs, draws the hemp through the teeth of the revolving combs, and its own teeth being caused to move faster than the hemp, a thorough and efficient combing-action is produced on the same, producing better results than can be effected in the present way, and the same is accomplished in one complete machine, and more economically, requiring only one feeding-operation, and less attendance.

Figure 1 is a side elevation, with some parts sectioned, of our improved machine;

Figure 2 is a plan view of the same; and

Figure 3 is a transverse section, taken on the line *x x*, of fig. 2.

Similar letters of reference indicate corresponding parts.

A represents the endless chain of the drawing-frames, and A', the condensing-apparatus, to which the laps are now presented for dressing and reducing to slivers, and which are of the common construction and arrangement, except as to the guiding angle-plates B, which we attach to the rails C, of the frame, and arrange so that the vertical parts D project downward, to the top of the comb-rods E, to prevent, more effectually, the raising of the said rods, and tilting backward, which takes place when the hemp offers great resistance, and which is not prevented as much as is desirable by the stud-pins F, applied to the plates H, at the ends of the rods, for the purpose, which said pins work under, and above the ribs H', on the side rails of the frame.

We extend the frame of this machine, at the receiving-end, and apply an endless carrying-belt, K, and a series of revolving comb-cylinders, L, above it, also, a feeding-belt, M, and feeding-rollers N, arranging, under each comb-cylinder, a smooth roller, N', for keeping the belt up to the comb-cylinders.

All the comb-cylinders and rollers are geared together, in any suitable way, to impart a uniform speed, and to cause them to move in the direction to convey the fibre toward the endless chain A, but at a slower speed than that of the said chain.

In this example we have represented the said rollers and comb-cylinders as being driven by a belt, O, working from a pulley, P, connected with the driving-mechanism for the chain A, but they may be operated in any other suitable way.

To this drawing and combing-apparatus, we supply the hemp over the feeding-apron M, in the same condition that it is now fed to the lap-machines, and reduce it to slivers, as above described, in an efficient and economical manner.

Any number of comb-cylinders preferred, or found best, in practice, may be used.

Having thus described our invention,

We claim as new, and desire to secure by Letters Patent—

The combination, with the drawing and condensing-apparatus A A', of the combing and drawing-apparatus, consisting of the revolving comb-cylinders L, endless carrying-belt K, rollers N', and feed-devices, all substantially as specified.

The above specification of our invention signed by us, this 11th day of October, 1869.

CHARLES WALL.
JOHN STEWART.

Witnesses:
GEO. W. MABEE,
E. TATE.